US012353233B2

(12) United States Patent
Eriksen

(10) Patent No.: US 12,353,233 B2
(45) Date of Patent: Jul. 8, 2025

(54) BRAKE SYSTEM WITH CONTROLLED PEDAL FEEDBACK

(71) Applicant: Asetek Danmark A/S, Aalborg East (DK)

(72) Inventor: André Sloth Eriksen, Nibe (DK)

(73) Assignee: Asetek Danmark A/S, Aalborg East (DK)

( * ) Notice: Subject to any disclaimer, the term of this patent is extended or adjusted under 35 U.S.C. 154(b) by 0 days.

(21) Appl. No.: 18/297,306

(22) Filed: Apr. 7, 2023

(65) Prior Publication Data
US 2023/0324943 A1 Oct. 12, 2023

(30) Foreign Application Priority Data

Apr. 7, 2022 (DK) .......................... PA 2022 00331

(51) Int. Cl.
F15B 13/044 (2006.01)
G05G 5/03 (2008.04)
G09B 9/04 (2006.01)

(52) U.S. Cl.
CPC ............ G05G 5/03 (2013.01); F15B 13/044 (2013.01); G09B 9/04 (2013.01); G05G 2505/00 (2013.01)

(58) Field of Classification Search
CPC ....... B60T 13/66; B60T 8/4072; F15B 13/044
See application file for complete search history.

(56) References Cited

U.S. PATENT DOCUMENTS

2014/0014451 A1* 1/2014 Nakata .................... B60T 8/267
188/358

* cited by examiner

Primary Examiner — Nathaniel E Wiehe
Assistant Examiner — Daniel S Collins
(74) Attorney, Agent, or Firm — Finnegan, Henderson, Farabow, Garrett & Dunner, LLP

(57) ABSTRACT

A brake system for a driving simulator, the brake system comprising a master cylinder chamber and a slave cylinder chamber which are arranged in fluid communication via a hydraulic system. The master cylinder chamber comprising a master cylinder piston which is mechanically connected to a brake pedal such that movement of the brake pedal results in translation of the master cylinder piston along the axis of said master cylinder chamber. The hydraulic system comprising a pressure module which is arranged such that it divides the hydraulic system into a master side in fluid communication with the master cylinder chamber and a slave side in fluid communication with the slave cylinder chamber. The pressure system is adapted to intermittently increase and decrease the pressure in the hydraulic system such that tactile feedback is provided to the brake pedal.

5 Claims, 4 Drawing Sheets

BRAKE SYSTEM WITH CONTROLLED PEDAL FEEDBACK

The present invention relates to brake systems for driving simulators, in particular hydraulic brake systems with tactile feedback.

BACKGROUND ART

Simulation system for simulating driving a car is used for both gaming as well as for training persons involved in driving vehicles such as racing car drivers.

A driving simulator can be defined as a system that simulates the operating conditions of a vehicle in an environment. Where the vehicle simulated is an automobile, the vehicle will usually include the typical automobile controls such as a steering wheel, a gear shift, an accelerator pedal, and a brake pedal. Generally, this vehicle will be simulated in an environment which will typically include a road.

Driving simulators provide a means to efficiently train operators of a vehicle. The operator of a vehicle can safely learn, from the simulator, how the vehicle will operate in a given set of conditions without actually exposing the operator to any of the risks inherent in real world operation of the vehicle. The experience garnered through making mistakes on a simulator is invaluable when compared to the inherent risks of vehicle damage and operator injury associated with making a driving error in a real-life situation. For example, in a police training application, a student could learn the limits of a police car or guidelines for pursuit and be tested in these areas without any of the associated risks of real-life training.

In addition to concerns relating to operator safety and vehicle damage, training through actual vehicle operation has other pitfalls. In particular, the cost of instructor time may be prohibitive. Furthermore, a specific vehicle such as a racing car or truck, may simply not be available for training purposes.

To enhance the effectiveness of the training afforded by driving simulators, there is a need to ensure that the simulator realistically simulates both the feel of operating the vehicle, as well as realistically simulating the effect of operating the various vehicle controls in specific situations. Realistically simulating the feel of operating a vehicle includes simulating the feel of the vehicle as it travels in a simulated environment as well as simulating the feel of the various vehicle controls during actual usage.

In driving simulators, the effectiveness of the training given by the simulator would be further enhanced if the feel of the brake pedal to the operator closely approximated the feel of an actual brake pedal in an actual car when the brake pedal is depressed. Further, the effect of depressing the brake pedal a given amount in the automobile simulator, as perceived by the operator (or user), should also closely approximate the effect that depressing the brake pedal the same amount has in a real-life automobile.

Today's automobiles are equipped with Anti-Lock Brake (ABS) systems. An ABS system is a safety feature added to automobiles to enhance the controllability of automobiles during braking manoeuvres. When non-ABS brakes are suddenly applied, or applied with great force, the brakes may lock up and consequently the automobile will often enter into an uncontrollable skid. An automobile tire will skid over the ground when the forward momentum of the automobile exceeds the velocity of the tire, thereby dragging the tire forward over the ground in a skidding fashion with less grip than when the wheel is rotating. An ABS brake system acts to prevent such uncontrollable skids by sensing when the tire is being dragged over the ground, and then decreasing the amount of stopping pressure exerted by the brakes against the wheel by an amount just sufficient to permit the tire to continue to roll over the ground while still slowing the rotation of the tire. The ABS system will then typically oscillate between increasing and decreasing the amount of braking force exerted against the brakes, and the braking force produced by the tire as the ABS system tries to slow the rotational velocity of the tires, while also preventing the brakes from locking up. This oscillation results in a unique, vibratory pulsation of the brake pedal during braking.

U.S. Pat. No. 5,607,308 discloses a vehicle simulator with realistic operating feedback. However, the vibratory pulsation of the brake pedal appearing when the ABS system is activated is generated by a single solenoid, which via an arm induces vibrations in the brake pedal. Although the simple mechanical system causes the brake pedal to vibrate, the feeling is not exactly the same as in real-life driving.

DISCLOSURE OF THE INVENTION

According to a first aspect of the present disclosure, a brake system for a driving simulator is provided. The brake system comprises a master cylinder chamber and a slave cylinder chamber, which are in fluid communication via a hydraulic system.

By fluid communication is understood that there can be an exchange of a fluid, in particular a hydraulic fluid between the master cylinder chamber and the slave cylinder chamber.

The master cylinder chamber further comprises a master cylinder piston. The master cylinder piston is mechanically connected to a brake pedal such that movement of the brake pedal results in translation of the master cylinder piston along the axis of said master cylinder chamber.

The movement of the master cylinder piston is arranged to act on a hydraulic fluid within the master cylinder chamber. As the master cylinder chamber and the slave cylinder chamber are in fluid communication this allows the movement of the brake pedal to affect the slave cylinder chamber via the hydraulic fluid.

The hydraulic system further comprises a pressure module, which is arranged such that it divides the hydraulic system into a master side in fluid communication with the master cylinder chamber and a slave side in fluid communication with the slave cylinder chamber.

In other words, the pressure module is fluidically arranged between the master cylinder chamber and the slave cylinder chamber. In one variant this may be done either by having the pressure module integrated with a fluid conduit of the brake system. In another variant this may be done by providing a pressure module with a fluid inlet and a fluid outlet to which fluid conduits connected to the master cylinder chamber and the slave cylinder chamber respectively may be connected. Such arrangement of the pressure module enables the pressure module to temporarily cut off contact between the master side and the slave side of the hydraulic system and interact differently with the two sides.

The pressure system is adapted to intermittently increase and decrease the pressure in said hydraulic system such that tactile feedback is provided to said brake pedal.

By intermittently increasing and decreasing the pressure in the hydraulic system the resistance felt by a user applying force to the brake pedal will also intermittently change. When the pressure in the hydraulic system is decreased the brake pedal may be depressed under force applied by a user.

When the pressure in the hydraulic system is increased it may work against the master piston and force the brake pedal towards the user in spite of the user applying pressure to the brake pedal. Alternating between these two situations will lead to vibrating tactile feedback for the user as the brake pedal moves intermittently in opposite directions.

Such tactile feedback provides the user with a tactical response during the driving simulation which closely corresponds to the tactile feeling of a brake pedal in a vehicle when ABS functionality is activated. Such life-like tactile response is beneficial as it enables more realistic simulation.

According to a further embodiment of the first aspect of the invention, the brake system comprises a pressure sensor for detecting the pressure within the hydraulic system and communicating the measurement to the driving simulator. The pressure sensor is arranged in fluid communication with the hydraulic system.

By having a pressure sensor arranged in fluid communication with the hydraulic system, the pressure within the hydraulic system may be detected. As the pressure correlates to the movement of the brake pedal through the movement of the master cylinder piston, the measurement of the pressure sensor corresponds to the force applied to the brake pedal. Hence the pressure sensor may provide the simulation software with a signal that can be used to determine the amount of braking of the simulated vehicle.

This pressure measurement may also be used to determine when an ABS braking session should be initiated. For example, an ABS braking session may be initiated when the magnitude of the detected pressure exceeds a predetermined thresholds for a predetermined duration.

In one variant the pressure sensor is arranged in direct fluid communication with the slave side of the hydraulic system. By direct fluid communication is understood that the fluid communication between the pressure sensor and the slave side of the hydraulic system is not communicated via the master side of the hydraulic system.

In an alternative variant, the pressure sensor is arranged in direct fluid communication with the master side of the hydraulic system. By direct fluid communication is understood that the fluid communication between the pressure sensor and the master side of the hydraulic system is not communicated via the slave side of the hydraulic system.

According to a further embodiment of the first aspect of the invention, the pressure module comprises a pump, which is adapted to increase the pressure of the hydraulic system when it is activated.

According to a further embodiment of the first aspect of the invention, the pressure module comprises an accumulator and a first valve. The first valve is adapted for opening and closing a fluid connection between the hydraulic system and the accumulator.

In a variant the accumulator and the first valve are arranged such that when the first valve is opened the accumulator comes into fluid communication with the master side of the hydraulic system.

The accumulator comprises a chamber which when in fluid communication with the hydraulic system increases the overall volume of the hydraulic system. When the volume of the hydraulic system increases the pressure in the hydraulic system will decrease.

According to a further embodiment of the first aspect of the invention, the first valve is a solenoid valve.

A solenoid valve is particularly suited as it may be activated electronically by remote control thereby making it easily adapted for activation by a computer system controlling the simulation software.

According to a further embodiment of the first aspect of the invention, the pressure module comprises a second valve which is adapted for temporarily closing and opening the fluid communication between the master side and the slave side of the hydraulic system.

A benefit of enabling the pressure module to temporarily cut the connection between the master side of the hydraulic system and the slave side of the hydraulic system it becomes possible to control the pressure of the master side which is affecting the brake pedal and thus the tactile response without affecting the slave cylinder.

According to a further embodiment of the first aspect of the invention, the second valve is a solenoid valve.

According to a second aspect of the present invention, a pressure module for use with a hydraulic brake system of a driving simulator is provided. The pressure module comprises means for establishing a fluid connection between the pressure module and a hydraulic system. For example, in one embodiment, there is described a connector configured to provide a fluid connection between the pressure module and a hydraulic system.

In one embodiment, the connector configured to provide a fluid connection between the pressure module and a hydraulic system, and more generally the means of establishing a fluid connection is understood that the pressure module may be directly integrated in fluid conduits of the brake system or that it may comprise a fluid inlet and a fluid outlet for connecting to fluid conduits at a first end which at the second end are connected to a braking cylinder thereby forming the hydraulic system.

The hydraulic system comprises a master side and a slave side.

The pressure module further comprises an accumulator for increasing the volume and thereby decreasing the pressure of the hydraulic system.

The pressure module further comprises a pump for increasing the pressure of the hydraulic system.

The pressure module further comprises a first valve arranged to control the fluid communication between the accumulator and the master side of the hydraulic system.

The pressure module further comprises a second valve arranged to control the fluid communication between the master side and the slave side 303 of the hydraulic system.

The pump of the pressure module, the first valve and the second valve are configured to be controlled by a driving simulation software to provide a tactile feedback.

The driving simulator software may send signals to the components of the pressure module to activate the valves and/or pump in a sequence to provide tactile feedback through the brake pedal corresponding to the tactile response in a brake pedal of a vehicle during ABS braking. The simulation software may thus send signals to activate, i.e. to open and close, the first valve as well as the second valve. Similarly, the simulation software may send signals to turn on and off the pump of the pressure module.

According to a further embodiment of the second aspect of the disclosure, the first valve is a solenoid valve.

According to a further embodiment of the second aspect of the disclosure, the second valve is a solenoid valve.

According to a further embodiment of the second aspect of the disclosure, the pump is driven by a DC motor.

According to a third aspect of the present disclosure, a method of creating tactile feedback in a brake pedal of a braking system for a driving simulator is provided.

The method comprises the steps of providing a braking system with a pressure module. In response to a signal from a simulation software of said driving simulator an ABS braking session is begun. During said ABS braking session the pressure module alternates between two or more modes such that the pressure within a hydraulic system of the braking system varies during the ABS braking session regardless of the pressure applied to the brake pedal.

According to a further embodiment of the third aspect of the disclosure, one of the two modes is a pump mode during which a pump is activated to increase the pressure within the hydraulic system.

According to a further embodiment of the third aspect of the disclosure, one of the two modes is an accumulator mode wherein a first valve is activated to open and provide fluid communication between an accumulator and the hydraulic system, such that the volume is increased and the pressure is decreased.

According to a further embodiment of the third aspect of the disclosure, alternation between the two or more modes happens with a frequency in the range of 1-15 Hz, more preferably with a frequency in the range of 5-10 Hz.

These frequency ranges of the alternation between the two or more modes lead to the tactile response of the brake system happening at frequencies corresponding to those of an ABS braking system of a vehicle providing a life-like response. That is the movement of the brake pedal in response to the action of the pressure module will take place with a frequency such that the movement of the pedal in response to the simulation will take place at a frequency corresponding to the movement of a brake pedal of a vehicle in response to ABS braking.

DETAILED DESCRIPTION OF THE INVENTION

The disclosure will now be described in further details with reference to drawings in which.

FIGS. 3A-3D schematically depict the principles of the pressure module when the valves are in different configurations.

The figures are only intended to illustrate the principles of the disclosure and may not be accurate in every detail. Moreover, parts which do not form part of the disclosure may be omitted. The same reference numbers are used for the same parts.

Figure 1:
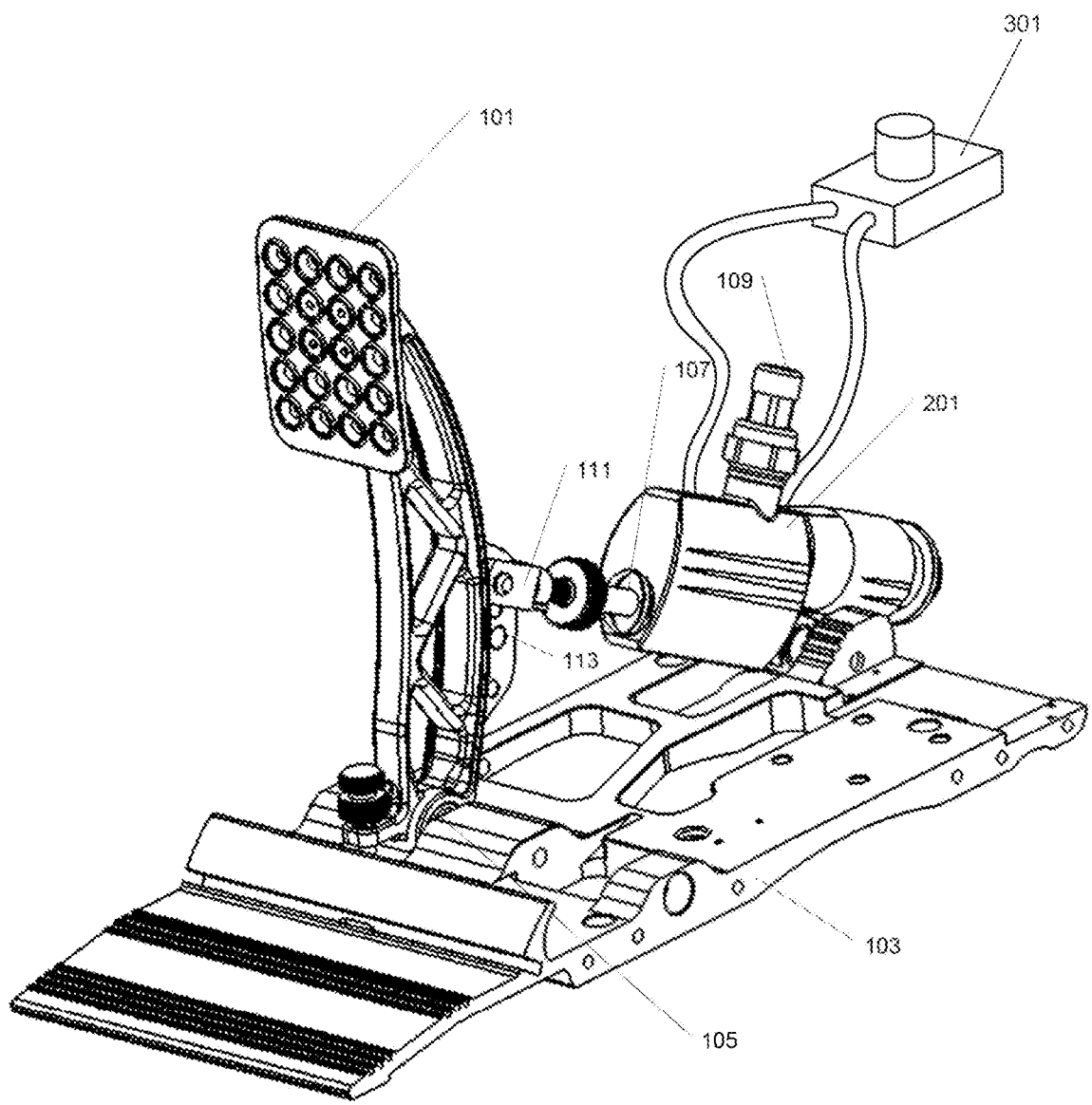
FIG. 1 illustrates a brake system for use with a brake cylinder according to the present disclosure.

FIG. 1 illustrates a brake system for use with a driving simulator. The brake system comprises a brake pedal 101 that is connected to a brake cylinder 201. The brake cylinder 201 may be a compact configuration as shown in FIG. 1 or the chambers of the brake cylinder may be split into different separated chambers. As schematically shown in FIG. 1 the brake cylinder 201 may be connected to a pressure module 301. By connected is understood that they share at least a fluid connection. The pressure module may be connected to the brake cylinder 201 and located away from the brake cylinder 201 itself. In other embodiments based on the same working principle the pressure module 301 may be integrated with or mounted directly to the brake cylinder 201.

In an embodiment the brake pedal 101 and brake cylinder 201 are mounted to a support surface 103. The brake pedal 101 may in an embodiment be mounted via a pivot axis 105 on a support surface 103 which is adapted to ensure that the brake system is supported in a stable manner as the area of the support surface 103 is larger than the area of the mounted pedal 101 and brake cylinder 201 projected onto the plane of the support surface such that it increases the area of contact between the brake system and the surface on which the brake system is located thus decreasing the risk of the brake system tilting during use. The support surface 103 further contributes weight such that the centre of mass of the brake system is lowered, thereby further increasing the stability of the position of the brake system, when it is in use.

The brake system is adapted to communicate with a computer running car simulation software, the communication between the brake system and a computer system could be via wires such as USB or wireless such as Bluetooth. In an embodiment, the communication should be real-time (or at least close to real time due to computational limits of processing inputs and data in a modern computer) to ensure that any actions on the brake pedal is immediately communicated to the software for instant reactions and a realistic feel in the simulation software. The communication may include exchange of information, for example a sensor of the brake system may supply the computer system with sensor data relating to the amount of force applied to the brake pedal 101. The simulation software of the computer system may also control part of the brake system, e.g. controlling when an ABS braking session is activated, i.e. when it begins and when it ends, as it may at least in part control the activation of the active components of the brake system.

During operation when the brake pedal 101 is depressed, that is when a user begins to apply force to the brake pedal, force is transferred to a master cylinder rod 107 which causes the movement of pistons within the brake cylinder 201 and in turn changes the pressure within the brake cylinder 201. A sensor 109 detects the pressure within the brake cylinder 201 and communicates this back to the computer system. The sensor is able to both detect when, how much, and how fast pressure on the brake pedal is changed. The simulation software then correlates this pressure measurement with a braking force.

The brake cylinder is connected to the brake pedal 101 by a rod connector 111, at the end of the piston rod of the master cylinder piston 107. The rod connector 111 connects to a mount plate 113 on an arm of the brake pedal 101. In an embodiment the rod connector 111 is a rod clevis which connects to the mount plate 113 by gripping around the mount plate 113 and being releasably fixed by fixing means such as a screw or bolt.

The movement of the brake pedal 101 when the user applies force to the brake pedal 101, i.e. when it is depressed, is considered that the brake pedal 101 moves forwards. The opposite direction of movement of the brake pedal 101, i.e. the direction that the pedal moves as the application of force to the brake pedal 101 is decreased, is considered that the brake pedal 101 moves backwards.

Figure 2:
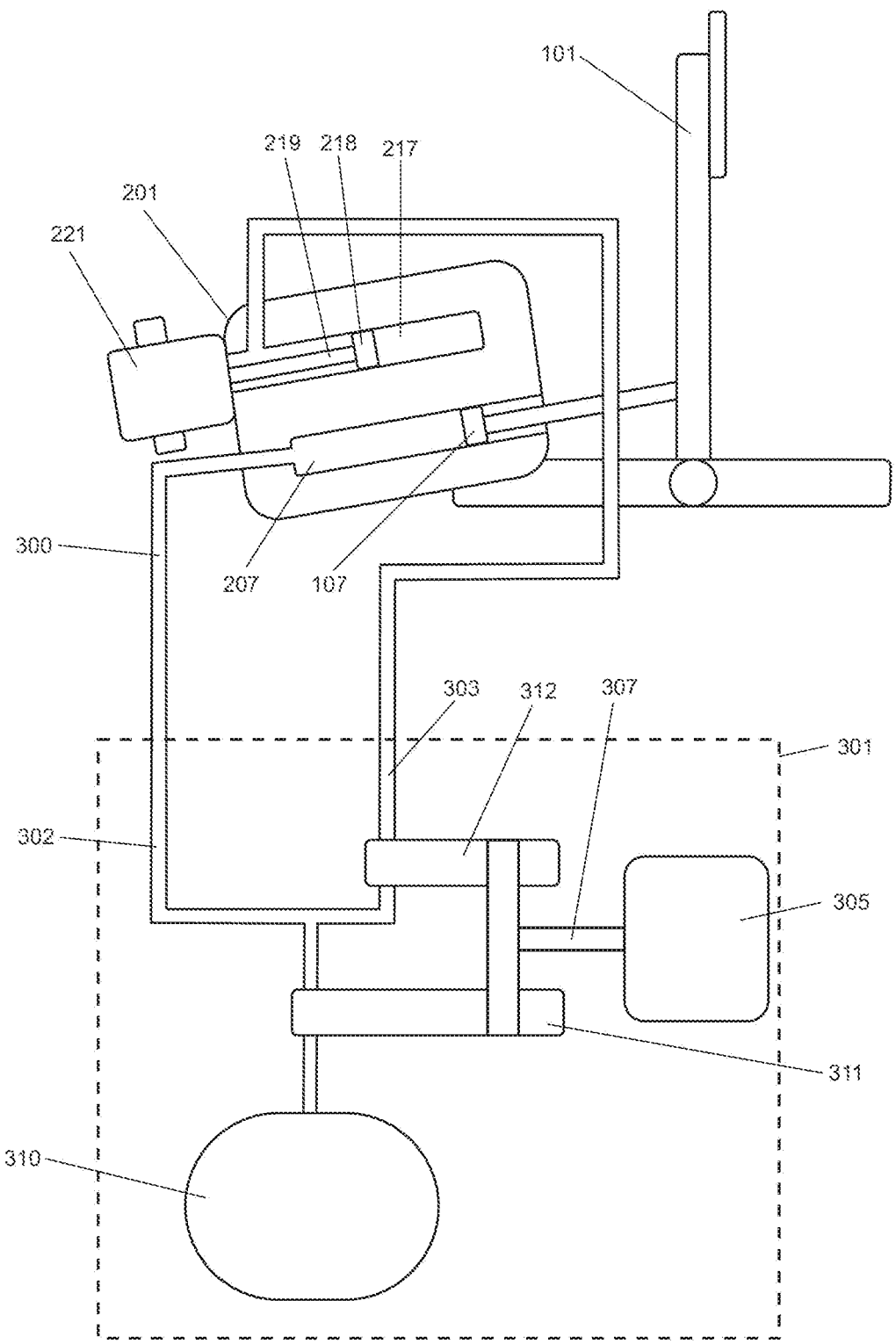
FIG. 2 is a schematical illustration of the system according to the disclosure.

FIG. 2 schematically illustrates the components of the brake system, the components are not to scale.

The brake cylinder 201 comprises a master cylinder chamber 207 and a slave cylinder chamber 217. In some embodiments the master cylinder chamber 207 and the slave cylinder chamber 217 may be integrated in the same housing of the brake cylinder as shown in FIG. 2. In alternative embodiments the master cylinder chamber 207 and the slave cylinder chamber 217 may be two separate units.

The master cylinder piston 107 is adapted to translate inside the master cylinder chamber 207 along the axis of the master cylinder chamber 207 when the brake pedal 101 is being pressed. The movement of the master cylinder piston 107 acts upon a hydraulic fluid in the master cylinder chamber 207.

The slave cylinder chamber 217 of the brake cylinder 201 comprises a slave cylinder piston 218. The slave cylinder piston 218 is connected with a damper system 221 via a slave cylinder rod 219. The damper system 221 is configured to control the stiffness and length of the brake pedal 101. In some embodiments the damper system 221 is configured to enable user adjustment of the stiffness and length of the brake pedal 101. The slave cylinder piston 218 is adapted to translate along the axis of the slave cylinder chamber 217. Such translation happens in response to hydraulic forces in the brake cylinder 201.

The master cylinder chamber 207 and the slave cylinder chamber 217 are in fluid communication such that the exchange of hydraulic fluid between the chambers 207, 217 is possible. The hydraulic communication of the chambers is facilitated by fluid conduits. A pressure module 301 is connected to those fluid conduits such that the hydraulic communication between the master cylinder chamber 207 and the slave cylinder chamber 217 takes place via the pressure module 301.

In other words, the hydraulic system 300 of the disclosure includes and extends from the master cylinder chamber 207 to the slave cylinder chamber 217 via the pressure module 301. The hydraulic system 300 thus forms a fluid connection between the master cylinder chamber 207 and the slave cylinder chamber 217.

The pressure module 301 divides the hydraulic system 300 into a master side 302 and a slave side 303, such that the master side 302 is the side including the master cylinder chamber 207, and the slave side is the side including the slave cylinder chamber 217.

The pressure module 301 includes a first valve 311 and a second valve 312. In an embodiment of the disclosure the first valve 311 and/or the second valve 312 are solenoid valves.

The second valve 312 is arranged such that it can open and close the fluid connection between the master side 302 and the slave side 303 of the hydraulic system 300. When the second valve 312 is open the master side 302 and the slave side 303 are in fluid communication. When the second valve 312 is closed the fluid connection between the master side 302 and the slave side 303 is cut off. Thus the pressure module 301 controls the connection between the master side 302 and the slave side 303 in the hydraulic system 300.

The pressure module 301 further comprises an accumulator 310. The accumulator 310 forms a chamber with a volume. The first valve 311 is arranged to open and close the connection of the accumulator to the master side 302 of the hydraulic system 300. When the first valve 311 is open the accumulator is in fluid communication with the master side 302 of the hydraulic system 300 thereby increasing the active volume of the hydraulic system 300. When the first valve 311 is closed, the accumulator 310 is cut off from the remained of the hydraulic system 300, thereby limiting the volume of the hydraulic system 300.

In an embodiment of the disclosure the valves 311 and 312 are controlled by the simulation software. In such embodiments the simulation software can then activate the ABS braking mode in response to the simulation situation where ABS would be appropriate for example due to road conditions or in response to a braking signal exceeding a threshold value in magnitude and/or duration.

The pressure module further comprises a pump 307. In an embodiment the pump 307 is driven by a DC motor 305. The pump is arranged such that it may increase the pressure in the hydraulic system 300, when it is activated.

Hence, the translation of the master cylinder piston 107 within the master cylinder chamber 207 may be due to any of the following: The depression of the brake pedal 101, release of the brake pedal 101 and backaction of the system action upon the master cylinder piston 107, or increased pressure in the hydraulic system 300 caused by the activation of the pump 307 of the pressure module 301 which will force the brake pedal 101 back towards its default, non-depressed position.

While the pressure module 301 is in the schematic FIG. 1 depicted as a region of the combined brake system including a number of features, it is to be understood that in practice the pressure module 301 may be one or more separate components with fluid inlets and fluid outlets for releasably connecting the pressure module 301 to the brake cylinder 201 via fluid conduits. Such assembly of the brake system has the benefit of easier maintenance and the exchange of worn components.

While not depicted in FIG. 2 the brake system further comprises a pressure sensor. The pressure sensor may be mounted anywhere in fluid communication with the hydraulic system 300. For example, it may be connected to either of the cylinder chambers 207, 217 as shown in FIG. 1 or as another example it may be connected to the hydraulic system as part of the pressure module 301. In yet other exemplary variants, the sensor may be connected separately to a fluid conduit of the brake system.

The FIGS. 3A-3D schematically illustrate the pressure module in different modes of operation. In the FIGS. 3A-3D a valve is schematically depicted as closed if it is diagonally hatched, while it is depicted as open if it has no hatching. A fluid conduit is depicted as being in fluid communication with the master cylinder chamber if it has circle hatching; note that the hatching is simply schematic illustration and does not indicate the actual distribution of a fluid flow through the valves, only that the valve is open or closed.

Figure 3A:
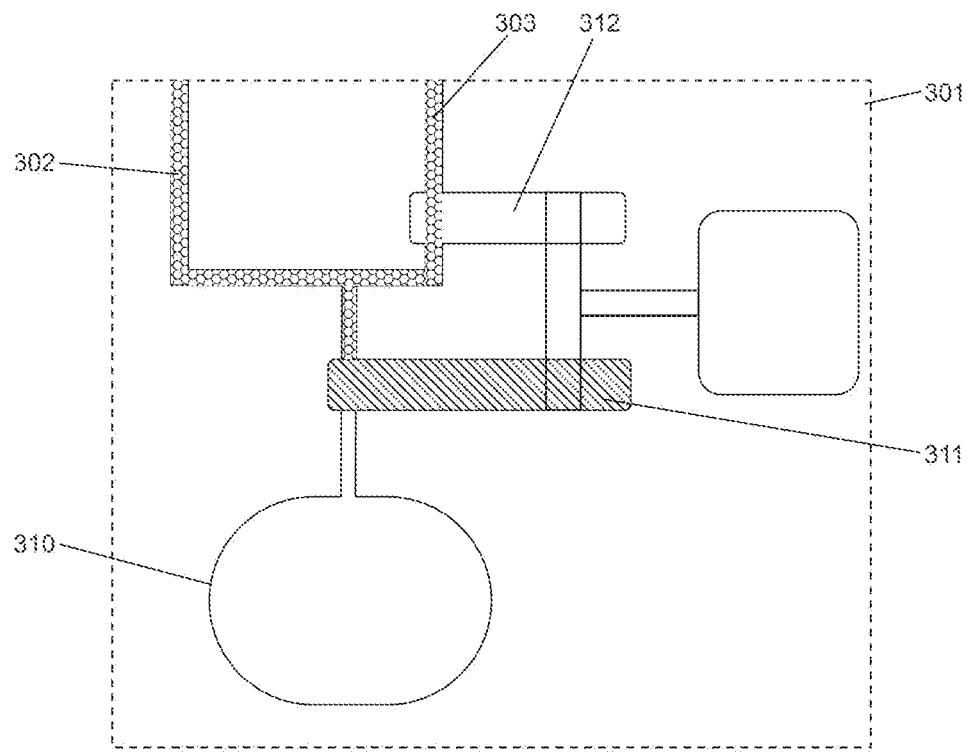

FIG. 3A schematically illustrates a first mode of the pressure module 301, where the brake system is in the normal braking mode, i.e. the default situation without the application of ABS. This normal braking mode is employed during normal driving, i.e. as opposed to ABS braking conditions, and occurs when the braking force does not exceed threshold conditions of amplitude and/or duration. In this normal driving and normal braking mode, the simulation software will not activate the ABS simulator system in the brake system.

In this default state for normal braking conditions the first valve 311 is closed, such that the accumulator 310 is cut off from the rest of the hydraulic system and the second valve 312 is open such that there is fluid communication between the master cylinder chamber and the slave cylinder chamber.

In this default state for normal braking, when the brake pedal 101 is depressed as force is applied to the brake pedal 101 this force will be translated from the pedal to the master cylinder piston 107 which in turn will cause the master cylinder piston 107 to act upon the hydraulic fluid within the master cylinder chamber 207. The force applied to the hydraulic fluid in the master cylinder chamber 207 will force the hydraulic fluid from the master cylinder chamber 207 through the fluid conduits of the hydraulic system 300. As the second valve 312 is open the hydraulic fluid will be forced to the slave cylinder chamber 217 where the pressure of the fluid activates the slave cylinder piston 218. The slave cylinder piston 218 interacts with the damper system 221, e.g. by compressing a damper in the damper system 221 and/or by contacting a mechanical block. As force is applied to the brake pedal 101 and resistance is provided by the damper system 221 the hydraulic fluid is pressed between the master cylinder piston 107 and the slave cylinder piston 218 causing the pressure within the hydraulic system 300 to rise. The increase in pressure is detected by a pressure sensor in fluid communication with the hydraulic system 300.

During normal braking operation, i.e. when the simulation software does not indicate a need for emulation of ABS braking conditions, the pressure module 301 remains in the default state illustrated in FIG. 3A, i.e. with the first valve 311 closed and the second valve 312 open. The user will feel the brake pedal 101 depress as force is applied, possibly followed by a period of little to no movement being felt by the user as the pressure increases in the hydraulic fluid.

When the user releases the brake pedal 101, i.e. by applying diminishing or no force to the brake pedal 101, the brake pedal 101 will return to its default position. The pressure in the hydraulic system 300 will decrease once again and both the slave cylinder position 218 and the master cylinder piston 107 will move back to their default positions. In various embodiments the brake cylinder comprises resilient structures such as resilient materials and/or springs which are arranged to apply force to the slave cylinder piston 218 and/or the master cylinder piston 107 in such a way that they are urged back to their default position when no pressure is applied to the brake pedal 101.

The simulator software controls the activation of the ABS simulator system for example due to conditions of the simulated world such as braking when the simulated vehicle is on a specific type of simulated surface or in response to the sensor data from the pressure sensor exceeding a threshold condition, or it could be activated by the software e.g. due to a detection of the left front wheel not moving or moving slower than the other wheels or just based on a reading from the pressure sensor detecting that the brake pressure is above a specific threshold value. When the ABS simulator system is activated, the brake system will alternate between different modes of the system. As the different modes change the pressure in the hydraulic system 300, they will affect the resistance felt during application of pressure to the brake pedal 101 causing a tactile response for the user stepping on the brake pedal 101. Preferably the change of operation modes of the pressure module 301 during the ABS braking session happens rapidly in short intervals giving the feeling of vibration or jerking of the pedal corresponding to the feeling when an ABS system is activated in real-life driving. For example the change of modes in the pressure module 301 during an ABS braking session may take place with a frequency which can be adjusted by the user to achieve the best and most realistic feeling for a given vehicle. In an embodiment the frequency of mode change during an ABS braking session is 1-15 Hz, more preferably 5-10 Hz. By an ABS braking session is understood the period from the beginning of ABS braking mode until the end of ABS braking mode and return to the normal braking mode, described in relation to the default configuration illustrated in FIG. 3A.

Figure 3B:
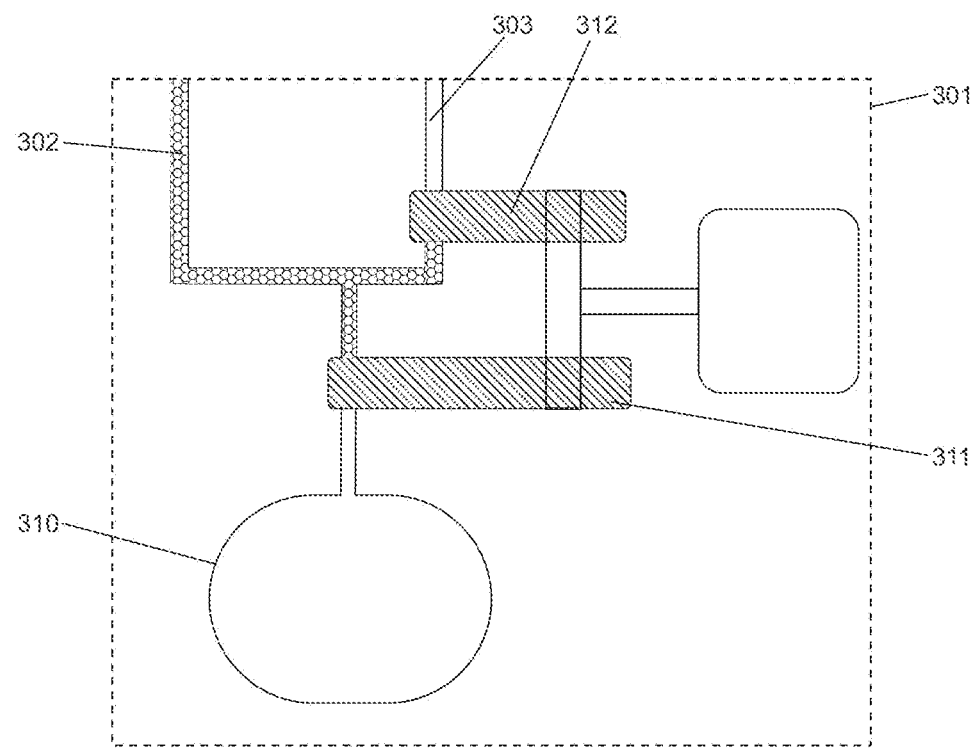

FIG. 3B illustrates a second mode of the pressure module 301 also called the closed mode. In the closed mode the first valve 311 will remain closed and the second valve 312 will also close. As the second valve 312 closes, the master side 302 and the slave side 303 of the hydraulic system 300 are cut off from each other. It is noted that the hydraulic fluid is not evacuated from the slave side 303 of the hydraulic system 300 but that hatching is an indication of fluid communication with the master side 302 simply for illustrative purposes of the effect of the valves.

As the second valve 312 closes and the slave side 303 is cut off from the master side 302, applying pressure to the brake pedal 101 will still cause the pressure in the master side 302 of the brake system to increase but the slave cylinder piston 218 will not move any further. The resistance experienced by the user applying force to the brake pedal 101 is thus that of compressing the brake fluid. For liquids which are low- or non-compressible fluids the resistance experienced will be high and the brake pedal 101 will feel immovable to the user. In embodiments of the disclosure the pressure sensor is connected to the slave side 303 of the hydraulic system 300, the detected pressure will remain constant when the second valve 312 is activated, regardless of the force applied to the brake pedal 101. In embodiments of the brake system, wherein the pressure sensor is connected to the master side 302 of the hydraulic system 300 any increase in the pressure due to force exerted on the brake pedal 101 will be registered in this mode of the ABS braking session.

Figure 3C:
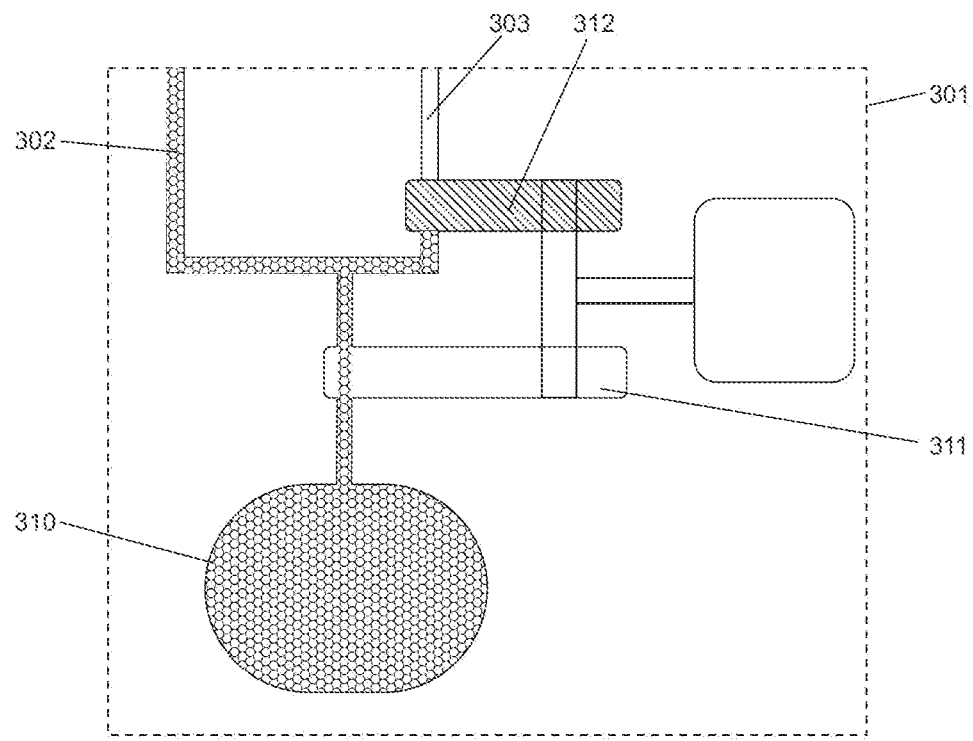

FIG. 3C illustrates a third mode of the pressure module 301 also called the accumulator mode. In the accumulator mode, the first valve 311 is open whereby the accumulator 310 is in fluid communication with the master side 302 thereby increasing the volume of the master side 302. The second valve 312 is closed such that the master side 302 is cut off from the slave side 303 of the hydraulic system 300. In the accumulator mode as the first valve 311 opens and the volume of the master side 302 increases, the pressure in the master side decreases. The decrease in pressure will lower the resistance that the user feels when pressing on the pedal. With the increased volume the pedal will be able to move a further distance under the same applied force, than it could before the volume increase, i.e. when the first valve 311 is closed. This is called that the pedal is made longer, as the pedal can move a further distance under the same pressure. As the volume change happens immediately when the first valve 311 opens, the change of the resistance of the brake pedal 101 will be a sudden change, causing the user's foot to jerk forward, as the ABS braking session will begin at a point where the user is applying force to the brake pedal 101.

Figure 3D:
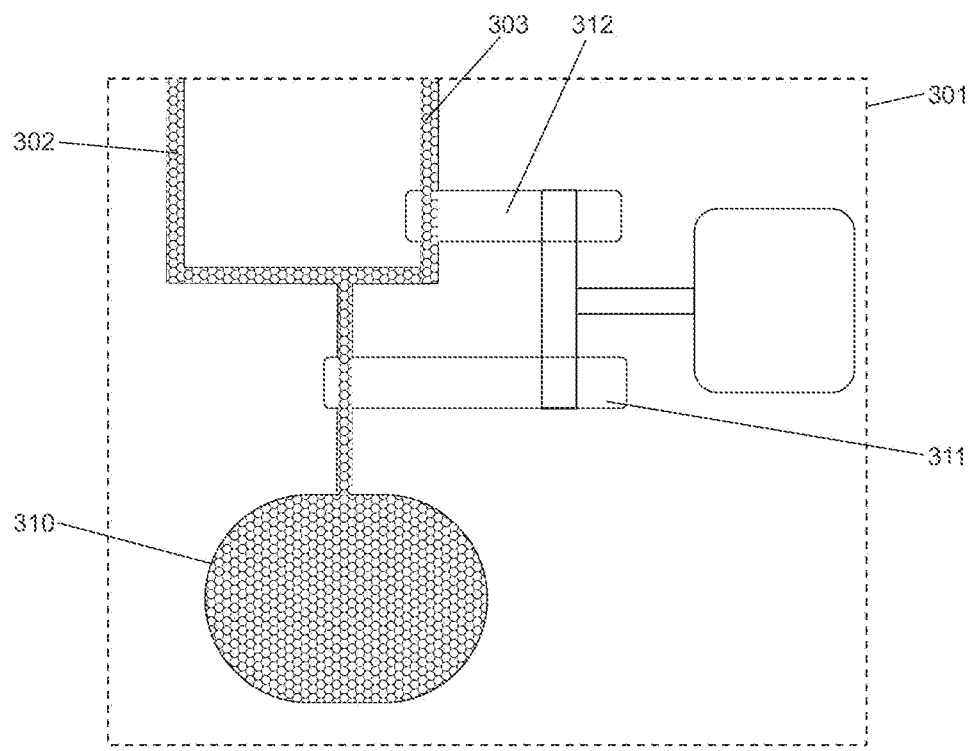

FIG. 3D schematically illustrates a fourth mode of the pressure module 301, also called the open mode, wherein both the first valve 311 and second valve 312 are open. In this situation the accumulator 310 is in fluid communication with the remainder of the hydraulic system 300 contributing to an increased volume. Simultaneously the master side 302 and the slave side 303 of the hydraulic system 300 is in communication. This mode may be an alternative default mode to the mode shown in FIG. 3A, as the master cylinder chamber and the slave cylinder chamber are in fluid communication the normal mode braking operation is achieved in this mode.

The increase of the volume in fluid communication with the master side 302 of the hydraulic system 300 by opening the first valve 311 and granting fluid access to the accumulator 310, has the same effect on lowering the resistance felt by the user applying pressure to the brake pedal 101, regardless of whether the second valve 312 is open or closed. Hence, if the state of the first valve 311 changes from closed to open the user will feel the brake pedal 101 getting longer and jerk forward under the pressure applied by the user in either of the configurations of FIG. 3C and FIG. 3D.

While not illustrated in the figures a fifth mode of the pressure module 301 exists and is also called the pump mode. In the pump mode the pump 307 is activated. The pump 307 is configured to increase the pressure in the hydraulic system 300. As the pressure in the hydraulic system 300 is increased it will increase the force applied to the master cylinder piston 217 in the opposite direction of the force applied by the user depressing the brake pedal 101. This will cause the resistance also called the counter-force on the brake pedal 101 to increase. Hence, the pressure increase caused by the activation of the pump 307 causes the brake pedal 101 to move backwards towards the user applying force to the brake pedal 101, giving a tactile feedback of push against the user's foot.

It is to be understood that the pump mode may be engaged simultaneously with any of the other modes described for the pressure module 301. That is the pump 307 may be activated regardless of the state of the first valve 311 and the second valve 312, i.e. regardless of whether they are opened or closed.

Different ABS experiences may be achieved by alternating or cycling the various described modes in rapid succession throughout an ABS braking session.

In one example of an embodiment, once the simulation software signals the beginning of an ABS braking session the second valve 312 will close whereby the master side 302 and the slave side 303 of the hydraulic system 300 are separated. While the second valve 312 remains closed the pressure module 301 will alternate between opening the first valve 311 and activating the pump 307. When the first valve 311 is opened the volume of the master side 302 of the hydraulic system 300 is increased such that the pressure is decreased and the brake pedal 1010 will jerk forward if the user maintains the same pressure applied to the brake pedal 101 as before the opening of the first valve 311. When the pump 307 is then activated the pressure in the master side 302 of the hydraulic system 300 will increase forcing the master cylinder piston 107 and the brake pedal 101 backwards, creating a push against the foot of the user applying pressure to the brake pedal 101. As the pressure module 301 alternates between these modes with a respectively lower and higher pressure throughout the ABS braking session, the brake pedal 101 will move rapidly forwards and backwards while the user applies pressure to the brake pedal 101, giving the user tactile feedback corresponding to the feedback felt when the ABS of a real vehicle is engaged. In an embodiment the alternation between the modes in the ABS braking session happens with a frequency between 4-12 HZ, more preferably between 5-10 Hz. Such frequency makes the movement of the brake pedal 101 give the user a tactile feedback in the form of vibration.

Once the simulation software sends signal that the ABS braking session has ended the pressure module 301 will revert back to the normal state, wherein the master side 302 and the slave side 303 of the brake system are in fluid communication.

In other equally described embodiments the mode alteration during an ABS braking session may be different from the previously described example. For example, in some embodiments the first valve 311 may remain open throughout the ABS braking session while the pump 307 is turned on and off to cause the vibrating response. In other variants the pump 307 may be configured to activate when the first valve 311 is closed and to turn off when the first valve 311 is opened. In some embodiments the second valve 312 may close at the beginning of the ABS braking session and open at the end of the ABS braking session. In other embodiments the opening and closing of the second valve 312 may also alternate throughout the braking session.

When the braking session with the ABS simulator system is finished the second valve 312 is opened such that the connection between the master side 302 and the slave side 303 is opened and the valve 311 closed such that the volume of hydraulic liquid is adjusted to the volume present in the hydraulic system before the braking session.

The components of the pressure module 301 are controlled by the simulation software. The pressure module 301 may be integrated with a hydraulic brake system. The pressure module 301 may be one or more separate components coupled into the fluid conduits of a hydraulic brake system.

The invention claimed is:

1. A pressure module for use with a hydraulic brake system of a driving simulator, the pressure module comprising:
   a connector configured to provide a fluid connection between the pressure module and a hydraulic system of the driving simulator, the hydraulic system comprising a master side and a slave side, the fluid connection including a master side fluid connection for hydraulic fluid communication with a master cylinder of the hydraulic brake system and a slave side fluid connection for hydraulic fluid communication with a slave cylinder of the hydraulic brake system;
   an accumulator for increasing the volume and thereby decreasing the pressure of the hydraulic system;
   a pump for increasing the pressure of the hydraulic system;
   a first valve arranged to control the fluid communication between the accumulator and the master side fluid connection such that when the first valve is open, the master side fluid connection is in fluid communication with the accumulator chamber volume and the master side fluid connection experiences a decrease in hydraulic fluid pressure due to the accumulator chamber volume;
   a second valve arranged to control the fluid communication between the master side and the slave side of the hydraulic system,
   wherein the pump, the first valve and the second valve provide a tactile feedback by intermittently increasing and decreasing the pressure of the hydraulic system.

2. A pressure module according to claim 1, wherein the first valve is a solenoid valve.

3. A pressure module according to claim 1, wherein the second valve is a solenoid valve.

4. A pressure module according to claim 1, wherein the pump is driven by a DC motor.

5. The pressure module according to claim 1, wherein the tactile feedback is applied to a brake pedal.

* * * * *